US007115536B2

(12) United States Patent
Hayden et al.

(10) Patent No.: US 7,115,536 B2
(45) Date of Patent: Oct. 3, 2006

(54) RARE EARTH CONTAINING $P_2O_5$-$WO_3$-$NA_2O$ GLASS FOR LASER APPLICATIONS

(75) Inventors: Joseph Hayden, Clarks Summit, PA (US); Sally Pucilowski, Luzerne, PA (US); Bianca Schreder, Frankfurt (DE); Ulrich Peuchert, Bodenheim (DE); Ruediger Sprengard, Mainz (DE); Martin Letz, Klein-Winternheim (DE)

(73) Assignee: Schott Glass Technologies, Inc., Duryea, PA (US)

( * ) Notice: Subject to any disclaimer, the term of this patent is extended or adjusted under 35 U.S.C. 154(b) by 185 days.

(21) Appl. No.: 10/378,945

(22) Filed: Mar. 5, 2003

(65) Prior Publication Data

US 2004/0176236 A1 Sep. 9, 2004

(51) Int. Cl.
*C03C 3/21* (2006.01)
*C03C 4/12* (2006.01)

(52) U.S. Cl. ............................. 501/45; 501/47; 501/46; 252/301.4 P; 252/301.5; 372/40; 385/141; 385/142

(58) Field of Classification Search ................. 372/40; 252/301.4 P, 301.5; 501/45–47; 385/141, 385/142
See application file for complete search history.

(56) References Cited

U.S. PATENT DOCUMENTS

| | | | |
|---|---|---|---|
| 3,278,318 A | 10/1966 | Hensler et al. | |
| 4,455,384 A | 6/1984 | Day et al. | |
| 5,334,559 A | 8/1994 | Hayden | |
| 6,376,399 B1 * | 4/2002 | Aitken et al. | ............ 501/41 |
| 6,911,160 B1 * | 6/2005 | Myers et al. | ........... 252/301.4 |

FOREIGN PATENT DOCUMENTS

| | | |
|---|---|---|
| JP | 61-40839 | 2/1986 |
| JP | 3-295828 | 12/1991 |
| WO | WO 00/78687 A1 | 12/2000 |
| WO | WO 01/53226 A1 | 7/2001 |
| WO | WO 01/92177 * | 12/2001 |
| WO | WO 01/292177 A1 | 12/2001 |

OTHER PUBLICATIONS

Inorganic Glass–Forming Systems by H. Rawson, University of Sheffield Department of Glass Technology Sheffield, England 1967, pp. 206–209.
Glass Science and Technology, 2–Colour Generation and Control in Glass, C.R. Bamford, Research and Development Laboratories Pilkington Brothers Ltd. Lathom, Ormskirk Lancs. England, Elsevier Scientific Publishing Company Amsterdam–Oxford–New York 1977, pp. 118–119.
Glass and Optical Materials, J. Am. Ceram. Soc., 85 (5) 1083–88 (2002) "Ultrafast Optical Switches and Wavelength Division Multiplexing (WDM) Amplifiers Based on Bismuth Oxide Glasses", Naoki Sugimoto, Research Center, Asahi Glass Co., Ltd., Yokohama 221–8755, Japan.
Experimental Parameters Affecting The Optical Behavior OF Some Sodium Tungstophosphate Glasses by Sofia Cristina Sanchez Franco, A Thesis Submitted To The Faculty of Alfred University —In Partial Fulfillment Of The Requirements For The Degree Of Master Of Science in Glass Science Alfred, New York–Oct. 7, 1988.
Patent Abstract of Japan, Publication No. 07–097234 — Date of Publication Nov. 4, 1995, Hoya Corp—Low–Melting Glass.

* cited by examiner

*Primary Examiner*—C. Melissa Koslow
(74) *Attorney, Agent, or Firm*—Millen, White, Zelano & Branigan, P.C.

(57) ABSTRACT

A rare earth containing glass nominally based on the ternary $P_2O_5$—$WO_3$—$Na_2O$-$Ln_2O_3$ compositional space, with $WO_3$>30–65 mole %, $Na_2O$ 15–35 mole %, $P_2O_5$ 5–65 mole %, $Ln_2O_3$ (Ln=one or more cations selected from lanthanum or any of the rare earth oxides) up to the limit of solubility; with optional additives, $MoO_3$ being a preferred additive, that can be employed alone or in combination at levels up to 15 mole %.

42 Claims, 4 Drawing Sheets

Ag₂O Profile in Ion Exchanged PWD Glass.

Figure 1 – Ag$_2$O Profile in Ion Exchanged PWD Glass.

Figure 2A – Transmission Curve of Sample From Figure 2B.

Figure 2B - Photo of 2 mm Thick Sample of Melt PWD-121.

Figure 3 – Normalized C-band gain improvement compared to state-of-the-art phosphate glass.

Figure 4 – Normalized C-band and L-band gain improvement compared to state-of-the-art phosphate glass.

RARE EARTH CONTAINING P₂O₅-WO₃-NA₂O GLASS FOR LASER APPLICATIONS

The glasses of the present invention are useful as active materials for generation and/or amplification of optical laser radiation. They are advantageously employed as sources or amplifying medium of light when doped with suitable active rare earth cations. They are particularly advantageously employed as sources or amplifying medium in telecommunications applications where they are doped with lanthamide cations, preferably with erbium cations, alone or in combination with ytterbium cations. When employed in this manner, the glasses of the present invention offer a lasing range that is broader, and more flat (uniform) in its gain, than the conventional erbium doped phosphate gain material commonly employed today. The glasses of this invention can be prepared in bulk or fiber form, and are structurable by conventional techniques such as ion exchange, allowing the preparation of planar and fiber waveguide structures that can be employed as these gain media.

The use of the glasses according to the invention enables small, compact amplifiers to be constructed from either fibers or planar waveguides that offer flat (uniform) amplification over an increased wavelength range compared to the currently existing EDFA for application to the C-band telecommunications wavelength region (from 1530 to 1562 nm) as well as for the L-band region (1570 to 1610 nm) that is expected to be employed in the future as there continues to be increased requirements for increased bandwidth.

In addition, glasses with broad emission are known to offer the potential to construct laser systems that operate with extremely short pulse lengths, less than 1 nsec or even shorter, e.g., at less than 1 psec or less than 500 fsec.

In one aspect, the invention relates to rare earth, Ln, doped glasses prepared within the ternary $P_2O_5$—$WO_3$—$Na_2O$ compositional space, with $WO_3$>30–65 mole %, preferably 50–60 mole %, more preferably about 55 mole %; $Na_2O$ 5–35 mole %, preferably 15–25 mole %; $P_2O_5$ 5–65 mole %, preferably >15–65 mole %, e.g., 16-, 17-, 18-, 19–65 mole preferably 20–30 mole %, that are also doped with $Ln_2O_3$ (where Ln refers to one or more cations selected from lanthanum or any of the rare earth oxides) at a content level up to the limit of solubility in the glass, preferably in the range of 0.01 to 2.0 mole %, more preferably 0.1–1.5 mole %, and even more preferably in the range of 0.2–0.4 mole %; with other optional additives such as $MoO_3$, $Nb_2O_5$, $TiO_2$, $B_2O_3$, $Ga_2O_3$, $Sb_2O_3$, $BaO$, $Bi_2O_3$, $SnO_2$, $Y_2O_3$, $ZrO_2$, $TaO_5$, $In_2O_3$, MO, and/or $R_2O$, wherein R is Li or K with or without the presence of other alkali, or is at least two elements selected from the group consisting of Li, Na, K, Rb, Cs, Ag, and Tl, and M is Mg, Ca, Sr or Zn; preferably $MoO_3$, that can be employed alone or in combination with other additives at levels preferably up to 15 mole %, preferably at levels below 10 mole %, e.g., for example for $TeO_2$, more preferably up to about 5 mole %, that may enhance the gain characteristics for particular applications, improve meltability and/or resultant optical quality of produced glass, and increase solubility for rare earth ions. $MoO_3$ can be advantageously included at levels of about 10 mole %. TeO2 affects the bandwidth of glasses. The glasses of the present invention offer increased cross section for stimulated emission and broader emission bandwidth compared to state of the art phosphate glass.

It is within the scope of the invention to batch the glasses with fluoride, carbonate, nitrate, and/or chloride compounds instead of, or in combination with, the oxide compounds. In each case when other than oxides are used to batch the glasses, enough material is input to be equivalent to the needed oxide amount.

The glasses of the present invention can be doped with rare earth oxides, including, but not limited to La, Ce, Pr, Nd, Sm, Eu, Gd, Tb, Dy, Ho, Pm, Lu, Tm, Er and/or Yb, preferably with Nd, Pr, Dy, Tm, Er, and/or, Yb, more preferably with Er, Yb, and/or Nd. Preferred ranges for Er are 0.01 to 0.40 mole %, more preferably 0.15–0.35 mole %, and even more preferably about 0.28–0.32 mole %. Preferred ranges for Yb are 0.1–1.4 mole %, more preferably about 0.3–1.2 mole %. Preferred ranges for Nd are 0.01–1.4, more preferably 0.3 to 1.2 mole %. These rare earth oxides can be employed alone or in combination of one or more in order to take advantage of other available lasing wavelengths and sensitization or up conversion schemes for generating or amplifying light at various wavelengths. Examples include Nd at nominally 0.9 μM, 1.0 μm, and 1.3 μM, Yb at nominally 1.0 μm, Tm at 1.4 and 2.0 μg, Dy at 1.3 μg, and Er at wavelengths other than 1.54 μm, for example Er at 2.9 μm.

In another aspect, the invention relates to the glass family based on $P_2O_5$—$WO_3$—$MO_3$—$Na_2O$ as a rare earth containing, structurable, laser glass to offer broad emission bandwidth for 1.54 μM radiation when doped with Ln ions, for example, erbium cations.

The glasses according to the invention offer a) a broader emission bandwidth compared to the state of the art erbium doped phosphate glass, b) a flatter gain curve compared to the state of the art erbium doped phosphate material, and c) structurability by ion exchange in a molten salt bath.

The glasses of the present invention are also useful as upconversion materials such as disclosed in JPH3-295828, and as a nonlinear optical medium for applications such as optical switches as disclosed in J. Am. Ceram. Soc. 85[5] 1083–1088 (2002). The low melting temperatures and high thermal expansion values of the glasses of this invention may make them attractive for non-optical applications such as soldering (joining) and sealing with high expansion glasses, metals and alloys, and encapsulation of electronic components without thermal damage.

In another aspect, the invention relates to a hybrid structure of one or more materials in which one or more of the materials is/are a glass of the present invention. For example, hybrid structures can be created by bonding the glasses of this invention to other materials, including but not limited to variants of the glasses of this invention containing no active ions. Further examples include bonding of the glasses of this invention to each other (for example a glass containing erbium and/or ytterbium to a glass containing another rare earth cation such as thulium, dysprosium or neodymium), or to other optical materials such as glasses and/or crystals, for example, lithium niobate, lithium tantalate, or other crystals, or even to other materials or components such as semiconductor materials and actual semiconductor laser diodes. In this way, multiple optical functionalites can be combined into a single structure, increasing integration of multiple optical functions into a small package. For example, it becomes possible in a single package to combine: multiple laser sources or amplifiers each operating at a different power level or wavelength, the excitation or pump laser with the amplifiers or source lasers, and/or the source lasers or amplifiers with frequency conversion or frequency and amplitude modulation elements.

Upon further study of the specification and appended claims, further objects and advantages of this invention will become-apparent to those skilled in the art.

The maximum rare earth content (Ln) of these glasses, due to solubility issues, appears to be about $2 \times 10^{20}$ Ln/cm³, however, higher concentrations, if successfully incorporated into the glasses, are within the scope of the invention. The Ln/cm³ value is a calculated value based on the mole % Ln in the glass composition. First, the weight % composition of Ln is calculated from the mole % composition, followed by calculating the number of ions/cm³ based on an assumed density of the glass. It is to be noted that the mole % of compounds in the glass compositions need not add up to a total of 100 mole % each time, as can be seen in some of the examples later in this application. In this art, deviations from compositions having 100 mole % material are common and well understood by those of ordinary skill.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by mol, unless otherwise indicated.

exhibited decreasing optical quality with increasing rare earth input. Analysis of several castings indicated that the crystals within each casting were enriched in Yb, Er, and P, as well as depleted in W, compared to the surrounding base glass. SEM and XRD analysis of crystals in many of these melts determined the composition to be a rare earth orthophosphate. These orthophosphates are of interest in identifying glass ceramic materials of high transparency containing a $Ln(PO_4)$ crystal phase.

TABLE 2

Rare Earth Doping of $P_2O_5$—$WO_3$—$Na_2O$

| Oxide | PWD-83 | PWD-83/2 | PWD-108 | PWD-109 | PWD-110 | PWD-111 | PWD-112 | PWD-113 |
|---|---|---|---|---|---|---|---|---|
| $Na_2O$ | 23.79 | 23.48 | 10 | 10 | 10 | 25 | 25 | 15 |
| $Er_2O_3$ | 0.24 | 0.3 | 0.32 | 0.31 | — | 0.29 | 0.3 | 0.31 |
| $Yb_2O_3$ | 0.97 | 1.21 | 1.26 | — | 1.25 | — | — | — |
| $Nd_2O_3$ | — | — | — | — | — | — | — | — |
| $WO_3$ | 55 | 55 | 55 | 55 | 55 | 40 | 55 | 45 |
| $MoO_3$ | — | — | 10 | 10 | 10 | 20 | — | 20 |
| $P_2O_5$ | 20 | 20 | 25 | 25 | 25 | 15 | 20 | 20 |

| Oxide | PWD-114 | PWD-115 | PWD-116 | PWD-121 | PWD-122 | PWD-123 | PWD-142 |
|---|---|---|---|---|---|---|---|
| $Na_2O$ | 15 | 25 | 25 | 15 | 25 | 25 | 20 |
| $Er_2O_3$ | 0.32 | 0.3 | 0.3 | 0.31 | — | 0.3 | — |
| $Yb_2O_3$ | — | 1.21 | 0.6 | — | 0.29 | 0.3 | — |
| $Nd_2O_3$ | — | — | — | — | — | — | 0.27 |
| $WO_3$ | 60 | 55 | 55 | 55 | 55 | 55 | 55 |
| $P_2O_5$ | 25 | 20 | 20 | 30 | 20 | 20 | 25 |

EXAMPLES

The examples were all prepared from the general heavy metal oxide system based on $P_2O_5$—$WO_3$—$MoO_3$—$Na_2O$ with a number of additional additives, including $Ln_2O_3$. Initial melts, summarized in Table 1, were selected to offer acceptable glass forming stability with a maximum ($WO_3$+ $MoO_3$)/$P_2O_5$ ratio in combination with a $Na_2O$ level that would be more than sufficient for ion exchange process ability (i.e. nominally 10 to 25 mole %), while batching $WO_3$ into the glass composition.

TABLE 1

Initial $P_2O_5$—$WO_3$—$MoO_3$—$Na_2O$
Glass Melting without $Ln_2O_3$

| Oxide | PWD-78 | PWD-85 |
|---|---|---|
| $Na_2O$ | 25 | 25 |
| $WO_3$ | 55 | 40 |
| $MoO_3$ | — | 20 |
| $P_2O_5$ | 20 | 15 |

PWD-78 and PWD-85 represent undoped base glasses used during the identification of this invention.

PWD-78 and PWD-85 represent undoped base glasses used during the identification of this invention.

Figure 1:
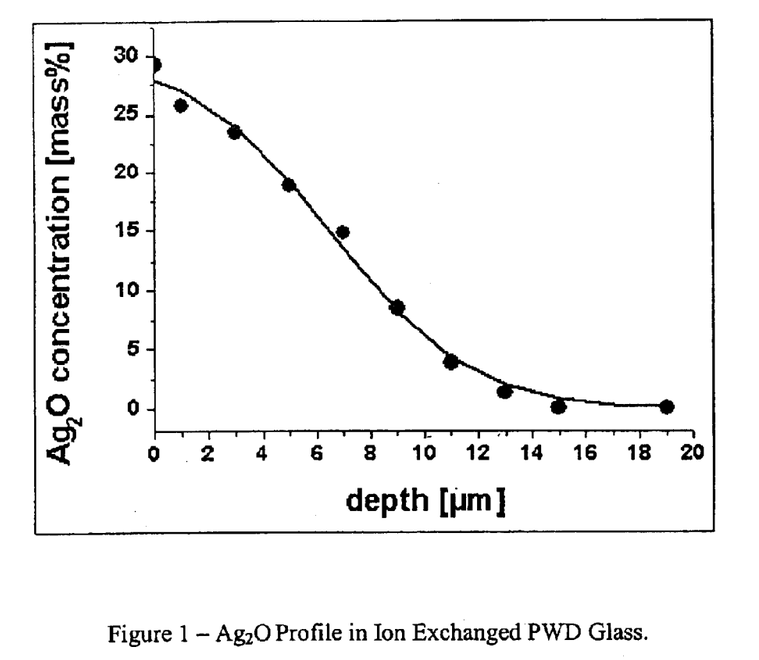
FIG. 1—$Ag_2O$ Profile in Ion Exchanged PWD Glass.

Rare earth incorporation was completed in the melts presented in Table 2. All Rare earth containing glasses The glasses of this invention can be ion exchanged using conventional thermal salt bath techniques well known in the industry, see for example "Glass waveguides by ion exchange: a review" Optical Engineering, Vol. 24, Number 2, pg 244–250 (1985). Glass PWD-85 was successfully ion exchanged by employing such standard molten salt bath procedures. Typical processing conditions were 30 minutes at a temperature of 180° C. with the glass placed in a salt bath prepared from 25 mole % $NH_4NO_3$ and 75 mole % $AgNO_3$. Resultant analysis indicated the presence of $Ag_2O$ to depths of 10 to 14 μm and concentrations exceeding 25 mass % at the glass surface. FIG. 1 shows a typical $Ag_2O$ profile. The rate of ion exchange found is actually higher than required. Exchange times of several hours would still be acceptable to the industry.

Figure 2A:
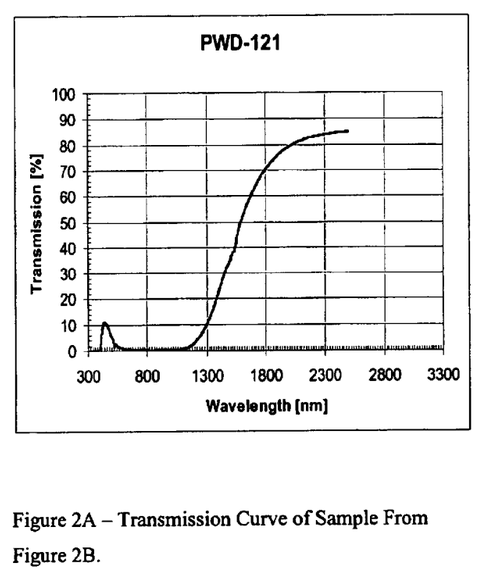
FIG. 2A—Transmission Curve and Sample From FIG. 2B.
Figure 2B:
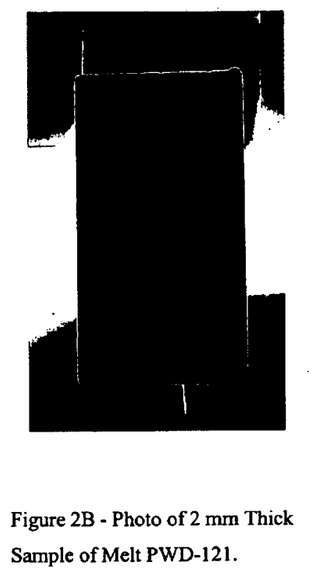
FIG. 2B—Photo of 2 mm Thick Sample of Melt.

One way to increase the ion exchange time is to reduce the Na2O content in the glass. Reduction of $Na_2O$ content in $P_2O_5$—$WO_3$—$Na_2O$ compositions results in a blue coloration of produced glass at regions where laser light generation or amplification is generally desired, see FIG. 2. This blue coloration is due to a valence change of $W^{6+}$ to $W^{5+}$ (to even $W^{3+}$, see for example, C. R. Bamford, *Colour Generation and Control in Glass*, Elsevier, pg 118 (1977)). At the same time, once the probable mechanism was understood to be reduction of W, efforts to solve the blue color problem included melts prepared where different batching patterns to adjust the melt redox condition to a more oxidizing condition. Alternatively, a lower $Na_2O$ content glass can be prepared by substituting some of the $Na_2O$ by one or more other alkali that do not exchange as well for $Ag_2O$.

An alternative path to lower diffusion coefficient for Na in $P_2O_5$—$WO_3$—$Na_2O$ glasses is to introduce glass modifiers that act as ion exchange barriers. Possible modifier additions include alkaline earths, $B_2O_3$, $Sb_2O_3$ and $Ga_2O_3$. Glasses prepared along these lines of reasoning are detailed in Table 3.

TABLE 3

Additional $P_2O_5$—$WO_3$—$Na_2O$ Glass Melting

| Oxide | PWD-124 | PWD-125 | PWD-127 | PWD-128 | PWD-129 | PWD-130 | PWD-131 | PWD-132 | PWD-133 | PWD-134 | PWD-135 | PWD-136 | PWD-20326 |
|---|---|---|---|---|---|---|---|---|---|---|---|---|---|
| $Bi_2O_3$ | | | | | | | | | 4 | | | | |
| $B_2O_3$ | | 5 | | | 5 | | 5 | 5 | | 5 | | | |
| $Na_2O$ | 23 | 25 | 25 | 23 | 25 | 25 | 20 | 20 | 21 | 25 | 25 | 25 | 25 |
| $Er_2O_3$ | 0.3 | 0.28 | 0.29 | 0.29 | 0.28 | 0.29 | 0.3 | 0.15 | 0.32 | 0.15 | 0.15 | 0.6 | 0.6 |
| $Yb_2O_3$ | | | | 0.29 | 0.28 | 0.29 | | 0.15 | | 0.15 | 0.15 | | |
| $Ga_2O_3$ | | 5 | | | | 5 | 5 | 5 | | | 5 | | |
| $Sb_2O_3$ | | | | | | | | | | | | | 5 |
| BaO | 2 | | | 2 | | | | | | | | | |
| $WO_3$ | 55 | 50 | 50 | 55 | 50 | 50 | 55 | 55 | 55 | 50 | 50 | 55 | 55 |
| $P_2O_5$ | 20 | 20 | 20 | 20 | 20 | 20 | 15 | 15 | 20 | 20 | 20 | 20 | 20 |

Tables 2 and 3 demonstrate a continual trend of rare earth content solubility limit, independent of the identity of the employed rare earth, to about $\leq 2 \times 10^{20}$ Ln/cm$^3$. The Er and Er codoped with Yb glasses offer improved Er spectroscopic properties over state-of-the-art phosphate glasses such as IOG-1 (IOG-1 is the example glass in U.S. Pat. No. 5,334,559). The Yb and Nd doped glasses offer lasing action, for example, PWD-122 and PWD-142 at roughly 1.02 um and 1.05 um, respectively. In addition, the broad width of emission in the glasses lends itself to the development of laser systems with short pulse lengths in the range of less than 1 nsec.

Many of the example glasses discussed here have been characterized for other properties as disclosed in Table 5.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to, adapt it to various usages and conditions.

TABLE 5

Glass Properties
Tungsten-Alkali-Phosphate

| Property | PWD-78 | PWD-85 | PWD-109 | PWD-112 | PWD-114 | Units |
|---|---|---|---|---|---|---|
| Density | 4.85 | 4.57 | 4.767 | 4.863 | 4.867 | g/cc |
| CTE | 155.8 | | | 157.8 | | $10^{-7}/°$ C. |
| Tg | 465.2 | 397 | | | | ° C. (DTA) |
| Tg | 459.4 | | | 463 | | ° C. (Dilatometer) |
| T soft | 525.9 | 450.3 | | 526.4 | | ° C. |
| Young's Modulus | 52.82 | 48.05 | | | | Gpa |
| 2900 nm | 0.93 | | | 1.1 | 1.62 | cm$^{-1}$ |
| 3000 nm | 1.34 | | | 1.58 | 2.31 | cm$^{-1}$ |
| 3333 nm | 1.88 | | | 2.18 | 3.07 | cm$^{-1}$ |

| Property | PWD-124 | PWD-125 | PWD-127 | PWD-133 | PWD-134 | PWD-135 | Units |
|---|---|---|---|---|---|---|---|
| Density | 4.925 | 4.66 | 4.77 | 5.197 | 4.663 | 4.765 | g/cc |
| CTE | | 158.3 | 160.5 | 147.9 | 161.6 | 156.3 | $10^{-7}/°$ C. |
| Tg | | 452 | 439 | 451 | 457 | 443 | ° C. (Dilatometer) |
| T soft | 530.6 | | | | | | ° C. |
| 2900 nm | 0.95 | 0.96 | 0.84 | 1.13 | 0.97 | 0.63 | cm$^{-1}$ |
| 3000 nm | 1.35 | 1.09 | 0.97 | 1.52 | 1.05 | 0.74 | cm$^{-1}$ |
| 3333 nm | 1.87 | 1.39 | 1.07 | 1.95 | 1.36 | 0.85 | cm$^{-1}$ |

Figure 3:
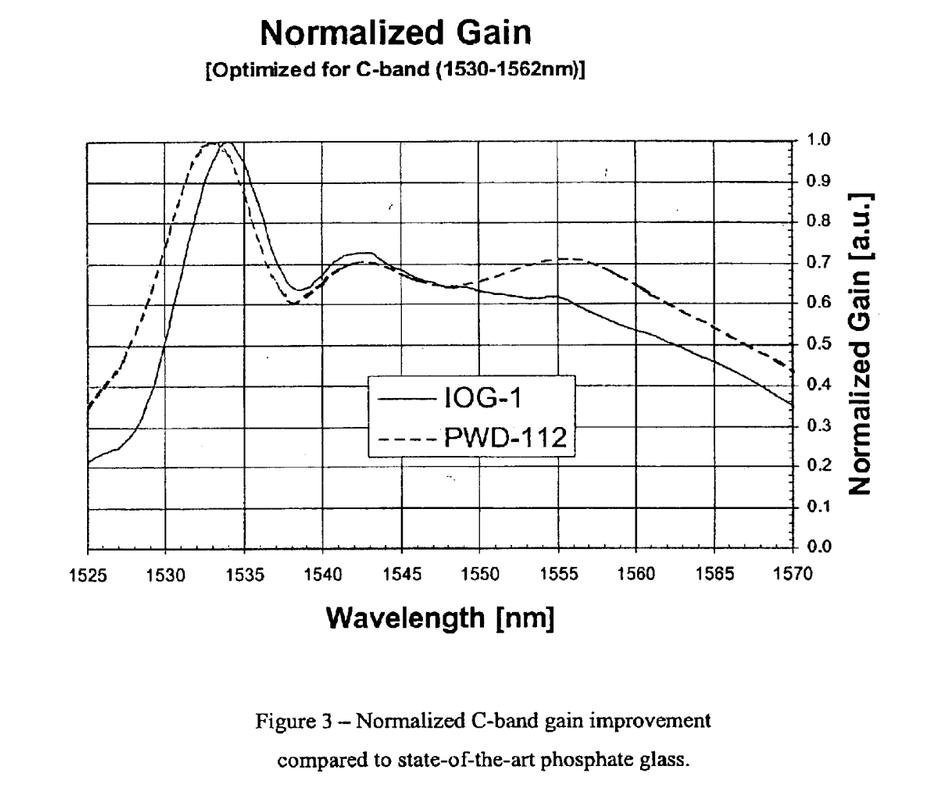
FIG. 3—Normalized C-band gain improvement compared to state-of-the-art phosphate glass.

FIG. 3 shows the improvement in gain possible with Example PWD-112 of the present invention in comparison to the prior art phosphate glass exemplified by glass IOG-1 when employed for C-band use.

Figure 4:
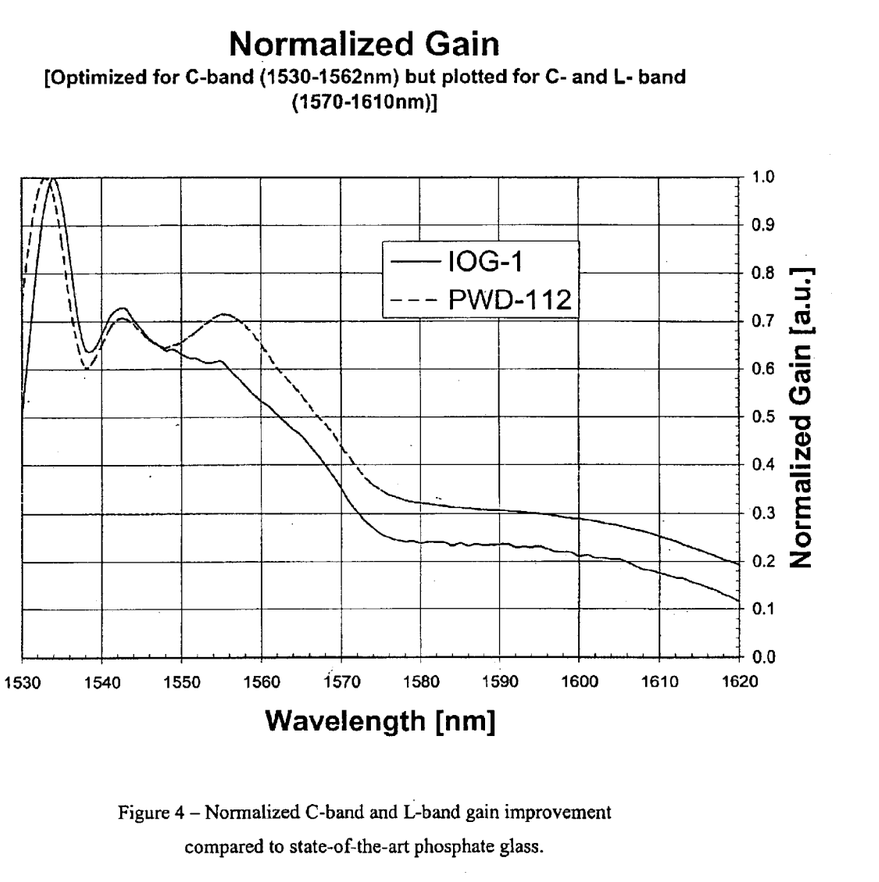
FIG. 4—Normalized C-band and L-band gain improvement compared to state-of-the-art phosphate glass.

FIG. 4 shows the improvement in gain possible with Example PWD-112 of the present invention in comparison to the prior art phosphate glass exemplified by glass IOG-1 when employed in both the C-band and L-band wavelength regions.

The entire disclosures of all applications, patents and publications, cited herein are incorporated by reference herein.

We claim:

1. A glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass, and wherein the glass contains essentially no Sb.

2. A glass according to claim 1, comprising 50–60 mole % $WO_3$.

3. A glass according to claim 1, comprising about 55 mole % $WO_3$.

4. A glass according to claim 1, comprising 15–25 mole % $Na_2O$.

5. A glass according to claim 1, comprising 20–30 mole % $P_2O_5$.

6. A glass according to claim 1, comprising 0.01–2.0 mole % rare earth oxides.

7. A glass according to claim 1, wherein the one or more rare earth oxides is $Er_2O_3$ or $Yb_2O_3$ or a mixture thereof.

8. A glass according to claim 1, comprising 0.15–0.35 mole % $Er_2O_3$.

9. A glass according to claim 1, comprising 0.28–0.32 mole % $Er_2O_3$.

10. A glass according to claim 1, comprising 0.1–1.4 mole % $Yb_2O_3$.

11. A glass according to claim 1, comprising 0.3–1.2 mole % $Yb_2O_3$.

12. A glass according to claim 1, further comprising $MoO_3$, $Nb_2O_5$, $TiO_2$, $B_2O_3$, $Ga_2O_3$, BaO, $Bi_2O_3$, $SnO_2$, $Y_2O_3$, $ZrO_2$, $TaO_5$, $In_2O_3$, MO, or $R_2O$, wherein R is a mixture of a) Li or K and b) another alkali metal, or R is a mixture of at least two elements selected from the group consisting of Li, Na, K, Rb, Cs, Ag, and Tl, and M is Mg, Ca, Sr or Zn, or a mixture thereof, in a total amount of up to 15 mole %.

13. A glass according to claim 1, further comprising $MoO_3$, $Nb_2O_5$, $TiO_2$, $B_2O_3$, $Ga_2O_3$, BaO, $Bi_2O_3$, $SnO_2$, $Y_2O_3$, $ZrO_2$, $TaO_5$, $In_2O_3$, Mo, or $R_2O$, wherein R is Li or K without the presence of another alkali metal, or is a mixture of at least two elements selected from the group consisting of Li, Na, K, Rb, Cs, Ag, and Tl, and M is Mg, Ca, Sr or Zn, or a mixture thereof, in a total amount of up to 15 mole %.

14. A glass according to claim 1, further comprising $MoO_3$, $Nb_2O_5$, $TiO_2$, $B_2O_3$, $Ga_2O_3$, BaO, $Bi_2O_3$, $SnO_2$, $Y_2O_3$, $ZrO_2$, $TaO_5$, $In_2O_3$, MO, or $R_2O$, wherein R is a mixture of a) Li or K and b) another alkali metal, or R is a mixture of at least two elements selected from the group consisting of Li, Na, K, Rb, Cs, Ag, and Tl, and M is Mg, Ca, Sr or Zn, or a mixture thereof, in a total amount of up to 10 mole %.

15. A glass according to claim 1, further comprising $MoO_3$, $Nb_2O_5$, $TiO_2$, $B_2O_3$, $Ga_2O_3$, BaO, $Bi_2O_3$, $SnO_2$, $Y_2O_3$, $ZrO_2$, $TaO_5$, $In_2O_3$, Mo, or $R_2O$, wherein R is Li or K without the presence of another alkali metal, or is a mixture of at least two elements selected from the group consisting of Li, Na, K, Rb, Cs, Ag, and Tl, and M is Mg, Ca, Sr or Zn, or a mixture thereof, in a total amount of less than 10 mole %.

16. A glass according to claim 1, further comprising $MoO_3$.

17. A glass according to claim 1, further comprising $MoO_3$ in an amount of about 10 mole %.

18. A method for preparing a glass according to claim 1, comprising bringing into a composition >30–65 mole % $WO_3$, 5–35 mole % $Na_2O$, 16–65 mole % $P_2O_5$, and one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass, and forming a glass from the composition.

19. A glass according to claim 1, which is in a bulk or fiber form.

20. A laser generator or amplifier containing a glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass.

21. A method of generating and/or amplifying optical laser radiation comprising using a glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass as an amplifying medium.

22. A planar or fiber waveguide structure comprising a glass according to claim 1.

23. An upconversion material, a nonlinear optical medium, an optical switch, a soldering or sealing material, or an encapsulating material over an electronic component, comprising a glass according to claim 1.

24. A glass comprising >30–65 mole % $WO_3$, 5–35 mole % $Na_2O$, and 17–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass, and wherein the glass contains essentially no Sb.

25. A glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass, and wherein the glass contains an amount of up to 15 mole % of only one of $Li_2O$ or $K_2O$ without the presence of another alkali metal, and wherein the glass contains essentially no Sb.

26. A glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass, and wherein the glass contains less than 10 mol % $TeO_2$, and wherein the glass contains essentially no Sb.

27. A glass according to claim 24 that contains less than 10 mol % $TeO_2$.

28. A glass according to claim 25 that contains less than 10 mol % $TeO_2$.

29. A laser glass comprising a glass lasing medium and an exit surface for laser radiation, wherein said glass lasing medium comprises >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass.

30. A laser glass according to claim 29, comprising 20–25 mole % $Na_2O$.

31. A laser glass according to claim 29 that contains less than 10 mol % $TeO_2$.

32. A hybrid structure of one or more materials comprising one or more materials in which one or more of the materials is/are a glass comprising >30–65 mole % $WO_3$, 5–35 mole % $Na_2O$, and 16–65 mole % $P_2O_5$, and doped with one or more rare earth oxides, wherein the rare earth is La, Ce, Pr, Nd, Sm, Eu, Gd, Tb, Dy, Ho, Pm, Lu, Tm, Er and/or Yb, up to the limit of solubility of the one of more rare earth oxides in the glass.

33. A hybrid structure comprising two glasses bonded to each other, wherein both glasses independently of each other comprise >30–65 mole % WO$_3$, 5–35 mole % Na$_2$O, and 5–65 mole % P$_2$O$_5$, and doped with one or more rare earth oxides, wherein the rare earth is La, Ce, Pr, Nd, Sm, Eu, Gd, Td, Dy, Ho, Pm, Lu, Tm, Er and/or Yb, up to the limit of solubility of the one of more rare earth oxides in the glass.

34. A hybrid structure according to claim 33, wherein at least one of the glasses bonded together contains 16–65 mole % P$_2$O$_5$.

35. A hybrid structure according to claim 33, wherein at least one of the glasses bonded together contains 50–60 mole % WO$_3$.

36. A laser generator or amplifier according to claim 20, wherein the glass comprises 50–60 mole % WO$_3$.

37. A laser generator or amplifier according to claim 20, wherein the glass comprises 15–25 mole % Na$_2$O.

38. A laser generator or amplifier according to claim 20, wherein the glass comprises 20–30 mole % P$_2$O$_5$.

39. A laser generator or amplifier according to claim 20, wherein the glass comprises 0.15–0.35 mole % Er$_2$O$_3$.

40. A laser generator or amplifier according to claim 20, wherein the glass comprises 0.1–1.4 mole % Yb$_2$O$_3$.

41. A laser generator or amplifier according to claim 20, wherein the glass contains less than 10 mol % TeO$_2$.

42. A laser generator or amplifier containing a glass according to claim 1.

* * * * *

UNITED STATES PATENT AND TRADEMARK OFFICE
CERTIFICATE OF CORRECTION

PATENT NO. : 7,115,536 B2
APPLICATION NO. : 10/378945
DATED : October 3, 2005
INVENTOR(S) : Joseph Hayden It is certified that error appears in the above-identified patent and that said Letters Patent is hereby corrected as shown below:

Column 7, line 1, reads "one of more" should read -- one or more --
Column 7, line 33, reads "Mo," should read -- MO, --
Column 7, line 49, reads "Mo," should read -- MO, --
Column 7, line 64, reads "one of more" should read -- one or more --
Column 8, line 6, reads "one of more" should read -- one or more --
Column 8, line 12, reads "of more rare" should read -- or more rare --
Column 8, line 24, reads "one of more" should read -- one or more --
Column 8, line 30, reads "one of more" should read -- one or more --
Column 8, line 39, reads "one of more" should read -- one or more --
Column 8, line 52, reads "one of more" should read -- one or more --
Column 8, line 64, reads "one of more" should read -- one or more --
Column 9, line 5, reads "one of more" should read -- one or more --

Signed and Sealed this

Fifteenth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,115,536 B2
APPLICATION NO. : 10/378945
DATED : October 3, 2006
INVENTOR(S) : Joseph Hayden It is certified that error appears in the above-identified patent and that said Letters Patent is hereby corrected as shown below:

Column 7, line 1, reads "one of more" should read -- one or more --
Column 7, line 33, reads "Mo," should read -- MO, --
Column 7, line 49, reads "Mo," should read -- MO, --
Column 7, line 64, reads "one of more" should read -- one or more --
Column 8, line 6, reads "one of more" should read -- one or more --
Column 8, line 12, reads "of more rare" should read -- or more rare --
Column 8, line 24, reads "one of more" should read -- one or more --
Column 8, line 30, reads "one of more" should read -- one or more --
Column 8, line 39, reads "one of more" should read -- one or more --
Column 8, line 52, reads "one of more" should read -- one or more --
Column 8, line 64, reads "one of more" should read -- one or more --
Column 9, line 5, reads "one of more" should read -- one or more --

This certificate supersedes Certificate of Correction issued May 15, 2007.

Signed and Sealed this

Fifth Day of June, 2007

JON W. DUDAS
*Director of the United States Patent and Trademark Office*